United States Patent [19]

Kerr et al.

[11] Patent Number: 5,013,791

[45] Date of Patent: May 7, 1991

[54] BETA-HYDROXYALKYLAMIDE CURED ACID POLYMER/POLYEPOXIDE POWDER COATING

[75] Inventors: Paul R. Kerr; Paul H. Pettit, Jr., both of Allison Park; William S. Ewing, Tarentum, all of Pa.

[73] Assignee: PPG Industries, Inc., Pittsburgh, Pa.

[21] Appl. No.: 396,708

[22] Filed: Aug. 22, 1989

Related U.S. Application Data

[62] Division of Ser. No. 139,489, Dec. 30, 1987, Pat. No. 4,889,890.

[51] Int. Cl.$^5$ .................. C08L 33/08; C08L 67/02
[52] U.S. Cl. .................. 525/113; 525/438; 525/934
[58] Field of Search .................. 525/113, 438, 934

[56] References Cited

U.S. PATENT DOCUMENTS

| | | | |
|---|---|---|---|
| 4,076,917 | 2/1978 | Swift et al. | 526/49 |
| 4,101,606 | 7/1978 | Cenci et al. | 526/15 |
| 4,346,144 | 8/1982 | Craven | 525/117 |
| 4,419,495 | 12/1983 | Davis | 525/113 |
| 4,444,923 | 4/1984 | McCarty | 525/112 |
| 4,446,258 | 5/1984 | Chu et al. | 525/112 |
| 4,727,111 | 2/1988 | pettit, Jr. et al. | 525/190 |

FOREIGN PATENT DOCUMENTS

| | | | |
|---|---|---|---|
| 0637646 | 3/1962 | Canada | 525/113 |
| 0897985 | 6/1962 | United Kingdom | 525/113 |

OTHER PUBLICATIONS

Lomax and Smith, "B-Hydroxyalkylamides, Low Polluting Crosslinkers for Carboxyl Containing Polymers," *Journal of Coatings Technology*, vol. 50, No. 643, Aug. 1978, pp. 49-55.

*Primary Examiner*—Allan M. Lieberman
*Assistant Examiner*—Robert E. L. Sellers, II
*Attorney, Agent, or Firm*—Daniel J. Long; Bruce H. Cottrell

[57] ABSTRACT

The thermosetting powder coating composition which has good stability and good physical properties, such as appearance, flexibility, hardness, solvent resistance and corrosion resistance, is disclosed. The composition comprises a co-reactable particulate mixture of a carboxylic acid group-containing polymer, a polyepoxide, and a beta-hydroxylalkylamide.

2 Claims, No Drawings

BETA-HYDROXYALKYLAMIDE CURED ACID POLYMER/POLYEPOXIDE POWDER COATING

This is a division of application Ser. No. 07/139,489 filed Dec. 30, 1987, now U.S. Pat. No. 4,889,890.

BACKGROUND OF THE INVENTION

The present invention relates to thermosetting powder coating compositions and, more particularly, to powder coating compositions employing a co-curing system.

Powder coating compositions for use in painting are extremely desirable. Such coating compositions greatly reduce and can even eliminate organic solvents used in liquid paints. When powder coating compositions are cured by heating, little, if any, volatile material is given off to the surrounding environment. This is the significant advantage over liquid paints in which organic solvent is volatilized into the surrounding atmosphere when the paint is cured by heating.

Powder coating compositions can be formulated with a carboxylic acid-functional acrylic polymer or a carboxylic acid-functional polyester. With such acid-functional polymers, the curing mechanism can be based upon one or more epoxy functional materials, e.g., a diglycidyl ether of a bisphenol or a glycidyl ether of a novolac resin. Although powder coating compositions using these materials give coatings with good properties, those including a novolac epoxy are expensive to formulate. Further, novolac epoxies tend to have low glass transition temperatures and, as a result, those powder coating compositions often have poor powder stability. Finally, novolac epoxies tend to result in yellowing of the powder coating compositions due to the action of heat and/or light.

SUMMARY OF THE INVENTION

In accordance with the present invention, a thermosetting powder coating composition is provided. The composition comprises a carboxylic acid group-containing polymer, an epoxy group-containing material having greater than one epoxy group per molecule and a beta-hydroxyalkylamide.

The powder coating compositions have good stability, i.e., they do not clump when exposed to ambient heat and give coatings with good corrosion resistance plus a good blend of other physical properties such as appearance, flexibility, hardness and solvent resistance. In addition, the powder coating compositions have excellent recoat adhesion.

DETAILED DESCRIPTION OF THE INVENTION

The powder coating compositions of the present invention comprise an intimate mixture of several materials. There are three essential ingredients in the powder coating compositions, namely, a carboxylic acid group-containing polymer, an epoxy group-containing material and a beta-hydroxyalkylamide.

The carboxylic acid group-containing polymer can generally be either a carboxylic acid group-containing acrylic polymer, a carboxylic acid group-containing polyester or mixtures thereof. A suitable carboxylic acid group-containing acrylic polymer, preferably has a number average molecular weight of about 1,500 to about 15,000, preferably about 1,800 to about 6,000, and a glass transition temperature (Tg) in the range of about 35° Celsius (C.) to 100° C., preferably about 45° C. to 70° C. Such acrylic polymers provide for hardness, gloss, solvent resistance, chemical resistance and detergent resistance in the resultant coating.

The molecular weights of polymers, such as the acrylic polymer, are determined by gel permeation chromatography (GPC) using a polystyrene standard. Therefore, it is not the actual molecular weight which is measured but an indication of the molecular weight as compared to polystyrene. The values which are obtained are commonly referred to as polystyrene numbers. However, for the purposes of this application, they are referred to as molecular weights. If the number average molecular weight of the acrylic polymer is below 1,500, the solvent resistance and mechanical strength of the resultant coating may be poor. If the number average molecular weight is higher than 15,000, the melt flow of the acrylic polymer is low and the coating may have poor appearance.

The Tg of the polymer is a measure of the hardness and melt flow of the polymer. The higher the Tg, the less the melt flow and the harder the coating. The Tg is described in *Principals of Polymer Chemistry* (1953), Cornell University Press. The Tg can be actually measured or it can be calculated as described by Fox in *Bull. Amer. Physics Soc.*, 1, 3, page 123 (1956). Tg, as used herein, refers to actually measured values. For measurement of the Tg of a polymer, differential scanning calorimetry (DSC) can be used (a rate of heating of 10° C. per minute, with Tg taken at the first inflection point).

If the Tg of the acrylic polymer is below 35° C., the polymer can tend to be sticky and difficult to handle. If the Tg is above 100° C., the melt flow of the acrylic polymer is low and the coating may have poor appearance.

The carboxylic acid group-containing acrylic polymer can be formed by reacting a polymerizable alpha, beta-ethylenically unsaturated carboxylic acid with one or more other polymerizable alpha, beta-ethylenically unsaturated monomers, e.g., esters of alpha, beta-ethylenically unsaturated carboxylic acids and optionally vinyl aromatic monomers.

Examples of the carboxylic acid group-containing monomers which can be used are acrylic acid and methacrylic acid, which are preferred, as well as crotonic acid, itaconic acid, fumaric acid, maleic acid, citraconic acid and the like, as well as mono alkyl esters of unsaturated dicarboxylic acids. The acid group-containing monomer is preferably present in the polymer in amounts from about 6 to about 25 percent by weight, more preferably from about 8 to about 18 percent by weight, most preferably from about 10 to about 14 percent by weight based on the total weight of the monomers. Amounts less than about six percent by weight may result in poor solvent resistance and poor mechanical strength in the coating.

Esters of alpha, beta-ethylenically unsaturated carboxylic acids are also used in forming the acrylic polymer. Preferably, such esters are $C_1$ to $C_{20}$ alkyl esters of acrylic acid or methacrylic acid and include methyl acrylate, ethyl acrylate, butyl acrylate, 2-ethylhexyl acrylate, dodecyl acrylate, methyl methacrylate, ethyl methacrylate, butyl methacrylate, 2-ethylhexyl methacrylate and the like. Preferably, these esters are present in amounts of about 5 to 70, more preferably from about 10 to 50 percent by weight based on the total weight of the monomers. More preferably, the esters of the alpha, beta-ethylenically unsaturated acids are a mixture of $C_1$ to $C_2$ alkyl esters and $C_4$ to $C_{20}$ alkyl esters, such as a mixture of methyl methacrylate and butyl methacrylate.

Examples of vinyl aromatic compounds are monofunctional vinyl aromatic compounds, such as styrene, which is preferred, and alkyl-substituted styrenes, such as alpha-methyl styrene, and substituted styrenes such as chlorostyrene. The vinyl aromatic monomer can be present in the composition in amounts from 0 to about 94 percent by weight, preferably from about 35 to about 70 percent by weight based on the total weight of the monomers. Higher amounts of a vinyl aromatic monomer may result in lower UV resistance whereas lower amounts may result in poorer detergent resistance.

In addition to the esters of alpha, beta-ethylenically unsaturated acids and the optional vinyl aromatic compounds, other ethylenically unsaturated copolymerizable monomers may be used. Examples include nitriles, such as acrylonitrile, vinyl halides and vinylidene halides, such as vinyl chloride and vinylidene chloride, and vinyl esters such as vinyl acetate. These additional monomers can be present in amounts of from 0 to about 40 percent by weight, preferably from 0 to about 30 percent by weight based on the total weight of monomers.

In preparing the carboxylic acid group-containing acrylic polymer, the various monomers are mixed together and are reacted by conventional free-radical initiated polymerization processes. Among the free-radical initiators, which may be used, are benzoyl peroxide, tertiarybutyl hydroperoxide, ditertiarybutyl peroxide, azobis(2-methylpropionitrile) and the like. Change transfer agents, such as mercaptopropionic acid and the like, can also be used. The polymerization is preferably carried out in solution using a solvent in which the monomers are soluble such as toluene or xylene. At the completion of the polymerization, the reaction mixture is devolatilized (e.g., by placing the mixture under vacuum to remove the organic solvent) and the polymer is recovered as a solid material. Alternatively, the polymer can be precipitated and subsequently dried. Usually, the devolatilized polymer will contain less than one percent by weight of materials that can volatilize at the temperatures used for curing the coatings.

Carboxylic acid group-containing acrylic polymers can also be prepared by emulsion polymerization, suspension polymerization, bulk polymerization or suitable combinations thereof. These techniques are well-known in the art. Besides free-radical initiated polymerization, other means of polymerization, such as group transfer and anionic polymerization, can be used to prepare the acrylic polymer.

The carboxylic acid group-containing polymer can also be a polyester. Such a carboxylic acid group-containing polyester can contribute flexibility, impact resistance, and corrosion resistance to the powder coating composition of the present invention. Among the carboxylic acid group-containing polyesters which may be used are those based on a condensation reaction of aliphatic polyols, including cycloaliphatic polyols with aliphatic and/or aromatic polycarboxylic acids and anhydrides. Examples of suitable aliphatic polyols include 1,2-ethanediol, 1,3-propanediol, 1,4-butanediol, 1,6-hexanediol, neopentyl glycol, cyclohexane dimethanol, trimethylolpropane and the like. Suitable polycarboxylic acids and anhydrides include succinic acid, adipic acid, azelaic acid, sebacic acid, terephthalic acid, isophthalic acid, tetrahydrophthalic acid, hexahydrophthalic acid, trimellitic acid and anhydrides of such acids.

The polyol and the acid or anhydride are reacted together with an excess of acid over alcohol so as to form a polyester which has free carboxylic groups. Preferably, on a resin solids basis, the carboxylic acid group-containing polyester will have an acid number of from about 20 to about 135, more preferably from about 30 to about 75, and will be a solid at room temperature. The polyester is further characterized as having a Tg from about 35° C. to about 100° C., preferably from about 40° C. to about 75° C.

The carboxylic acid group-containing acrylic polymer, the carboxylic acid group-containing polyester or mixtures thereof are preferably present in the powder coating composition in amounts from about 35 to about 85 percent by weight, more preferably from about 40 to about 80 percent by weight based on the total weight of resin solids. Greater amounts of acrylic generally result in coatings having better chemical resistance, but poorer flexibility, flow and impact resistance. Greater amounts of polyester generally result in coatings with better flexibility and flow but poorer chemical resistance.

The second essential ingredient of the powder coating composition is a polyepoxide. The polyepoxide serves as a curing agent for the carboxylic acid-functional polymer. Further, the polyepoxide can contribute flexibility, corrosion resistance and detergent resistance to the powder coating composition. A wide variety of polyepoxides may be utilized as in the powder coating compositions. Preferably, the polyepoxide should have a 1,2-epoxy equivalency greater than one and more preferably greater than about 1.9. Examples of useful polyepoxides are polyglycidyl ethers of aromatic polyols, e.g., polyphenols. Such polyepoxides can be produced, for example, by etherification of an aromatic polyol with epichlorohydrin or dichlorohydrin in the presence of an alkali. The aromatic polyol may be, e.g., bis(4-hydroxyphenyl)-2,2-propane (generally known as bisphenol A), bis(4-hydroxyphenyl)-1,1-ethane, bis(4-hydroxyphenyl)-1,1-isobutane, bis(4-hydroxy tertiarybutylphenyl)-2,2-propane, bis(2-hydroxynaphthyl)methane, 4,4'-dihydroxybenzophenone, 1,5-dihydroxynaphthalene and the like. Polyepoxides based on bisphenol A are preferred from among the polyglycidyl ethers of aromatic polyols.

Also suitable as the polyepoxide are polyglycidyl ethers of polyhydric alcohols, such as 1,2-ethanediol, 1,2-propanediol, 1,3-propanediol, 1,4-butanediol, 1,5-pentanediol, diethylene glycol, triethylene glycol, polyethylene glycol, polypropylene glycol and the like.

Generally, the polyepoxides have epoxy equivalent weights from about 100 to about 1,000, preferably from about 150 to about 800. The polyepoxides are preferably present in amounts from about 2 to about 45 percent by weight, more preferably from about 10 to about 40 percent by weight based on total weight of resin solids in the powder coating composition.

The final essential ingredient in the powder coating compositions of the present invention is a beta-hydroxyalkylamide. The beta-hydroxyalkylamide is also a curing agent for the carboxylic acid-functional polymer of the composition. The beta-hydroxyalkylamide can help provide a crosslink polymer network which is hard, durable, corrosion-resistant and solvent-resistant. It is believed the beta-hydroxyalkylamides help cure the coating through an esterification reaction with the carboxy-containing polymers to form multiple ester linkages. The hydroxyl functionality of the beta-hydroxyalkylamide should be on an average basis at least two, preferably greater than two, and more preferably from greater than two up to about four in order to obtain optimum curing response.

The beta-hydroxyalkylamide materials can be depicted structurally as follows:

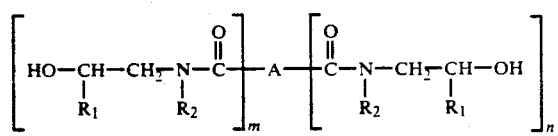

wherein $R_1$ is H or $C_1$–$C_5$ alkyl; $R_2$ is H, $C_1$–$C_5$ alkyl or:

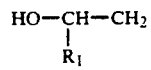

wherein $R_1$ is as described above; A is a bond, monovalent or polyvalent organic radical derived from a saturated, unsaturated or aromatic hydrocarbon including substituted hydrocarbon radicals containing from 2 to 20 carbon atoms. Preferably, A is an alkylene radical $-(CH_2)_x-$ where x is from 2 to 12, preferably from 4 to 10, m is from 1 to 2, n is from to 0 to 2, and m+n is at least 2, preferably greater than 2, more preferably within the range of from greater than 2 up to about 4.

The beta-hydroxyalkylamide can be prepared by reacting a lower alkyl ester or mixture of esters of carboxylic acids with a beta-hydroxyalkylamine at a temperature ranging from ambient temperature up to about 200° C. depending on the choice of reactants and the presence or absence of a catalyst. Suitable as catalysts are basic catalysts including, e.g., sodium methoxide, potassium methoxide, sodium butoxide, potassium butoxide, sodium hydroxide and potassium hydroxide present in amounts of about 0.1 to about 1 percent by weight based on weight of alkyl ester.

To bring about effective cure of the powder coating composition, the equivalent ratio of beta-hydroxyalkylamide (hydroxy equivalents) plus polyepoxide (epoxy equivalents) to carboxy-containing materials (carboxylic acid equivalents, plus anhydride equivalents, with each anhydride counting as two carboxy groups) is preferably from about 0.6 to 1.6:1, more preferably from 0.8 to 1.3:1. Ratios outside the range of 0.6 to 1.6:1 are undesirable because of poor cure. Both the beta-hydroxyalkylamide and any carboxylic acid group-containing acrylic polymer in the formulation are sensitive to moisture in the uncured state so that under cure or poor cure of the powder coating composition would give unfavorable properties.

The powder coating composition can further include a crystalline carboxylic acid group-containing material selected from the group of $C_4$ to $C_{20}$ aliphatic polycarboxylic acids, polymeric polyanhydrides, low molecular weight polyesters having an acid equivalent weight from about 150 to about 750 and mixtures thereof. This crystalline material can provide for flexibility and impact resistance in the resultant coating as well as assisting in the flow of the powder coating during cure thereby providing for smooth, glossy coatings.

Among the aliphatic polycarboxylic acids which may be used are included dicarboxylic acids such as adipic acid, suberic acid, azelaic acid, sebacic acid and dodecanedioic acid. Preferably, the aliphatic dicarboxylic acid contains an even number of carbon atoms. Dodecanedioic acid is the preferred aliphatic polybasic acid.

The polymeric polyanhydride includes those of the structure:

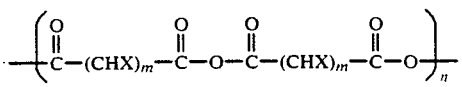

where X is equal to H, $CH_3$, $C_2H_5$ and m equals 4 to 12 and n is of such a value that the molecular weight of the polymeric polyanhydride is in the range of about 400 to 2,500, preferably about 600 to 1,200 on a number average basis. Molecular weights greater than 2,500 are undesirable because of a tendency to cause poor stability in the coating composition. Examples of suitable polymeric polyanhydrides are poly(adipic anhydride), poly(azelaic anhydride), poly(sebacic anhydride), poly(dodecanedioic anhydride) and mixed acid anhydrides.

The polymeric polyanhydride can be prepared by heating the acid precursor from which the anhydride is derived with a simple anhydride such as acetic anhydride and removing the evolved acid (acetic) which is generated under vacuum. Preferably, the acid contains an even number of carbon atoms.

The low molecular weight carboxylic acid group-containing polyester generally has an acid equivalent weight from about 150 to about 750. Such a polyester is crystalline and generally has a number average molecular weight from about 300 to about 1,500. The low molecular weight polyesters which may be used include condensation products of aliphatic polyols, preferably aliphatic diols, and aliphatic and/or aromatic polycarboxylic acids, preferably dicarboxylic acids. Examples of suitable aliphatic polyols include ethylene glycol (1,2-ethanediol), propylene glycol (1,3-propanediol), butylene glycol (1,4-butanediol), 1,6-hexanediol neopentyl glycol, cyclohexane dimethanol, trimethylolpropane and the like. Preferably, the aliphatic polyol is a diol such as ethylene glycol, propylene glycol, butylene glycol or 1,6-hexanediol. Suitable polycarboxylic acids include aliphatic dicarboxylic acids preferably $C_4$ to $C_{20}$ dicarboxylic acids such as adipic acid, azalaic acid, sebacic acid, dodecanedioic acid, succinic acid, undecanedioic acid, and aromatic dicarboxylic acids such as terephthalic acid, isophthalic acid, and phthalic acid. Preferably, the polycarboxylic acid is an aliphatic dicarboxylic acid containing from about 6 to 12 carbon atoms. Mixtures of such polycarboxylic acids or aliphatic polyols may also be used.

The ingredients are reacted together at an equivalent ratio of diol to diacid of from about 1:2 to about 2:3, preferably at about 1:2 so as to control the molecular weight in the range from about 300 to about 1,500 (number average). The resultant low molecular weight polyester has an acid number of about 75 to about 375 (i.e., an acid equivalent weight of about 150 to about 750) and is a crystalline solid at room temperature. Further, the resultant crystalline polyester material has a melting point of from about 50° C. to about 110° C., preferably from about 70° C. to about 110° C.

The amount of the crystalline carboxylic acid group-containing material in the powder coating composition can vary from 0 to about 25 percent by weight, and where present, preferably from about 5 to about 20 percent by weight based on total resin solids. Amounts greater than 25 percent by weight are undesirable because of increased powder stability problems.

The coating composition may also contain certain other additives that are typically incorporated into powder coating compositions, such as pigments, flow control agents, anti-popping agents, powder flow additives, light stabilizers, or catalysts.

In order to give the powder coating compositions a suitable color, a pigment can be included in the coating composition typically in amounts from about 1 to about 50 percent by weight, based on the total weight of the powder coating composition. Pigments which are suitable for powder coating composition may be organic or inorganic and include basic lead silica chromate, titanium dioxide, ultramarine blue, phthalocyanine blue, phthalocyanine green, carbon black, black iron oxide, chromium green oxide, ferrite yellow and quinto red.

Suitable as flow control agents are acrylic polymers, such as polylauryl acrylate, polybutyl acrylate, poly(2-ethylhexyl) acrylate, poly(ethyl-2-ethylhexyl) acrylate, polylauryl methacrylate, polyisodecyl methacrylate and the like and fluorinated polymers such as esters of polyethylene glycol or polypropylene glycol and fluorinated fatty acids. Polymeric siloxanes with molecular weights over 1,000 may also be used as a flow control agent, for example, polydimethylsiloxane or poly(methylphenyl)siloxane. The flow control agents can aid in reduction of surface tension during heating of the powder and in eliminating crater formation. Generally, the flow control agent, when used, is present in amounts from about 0.05 to about 5 percent by weight based on the total weight of the powder coating composition.

Anti-popping agents can be added to the compositions to allow any volatile material present to escape from the film during baking. Benzoin is a highly preferred degassing agent and when used in present amounts ranging from about 0.5 to about 3 percent by weight based on total weight of the powder coating composition. The powder coating compositions may also preferably contain UV absorbing agents, such as TINUVIN, which when used are typically present in the compositions in amounts of about 0.5 to about 6 percent by weight based on the total weight of the powder coating composition.

The powder coating compositions may also include a small percentage of a catalyst for the epoxy-acid reaction such as quaternary ammonium salts, quaternary phosphonium salts, phosphines, amines, imidazoles and metal salts. The catalyst, when used, is preferably present in amounts of between 0 and 5 percent by weight, more preferably from about 0.2 to about 2 percent by weight based on the total weight of the coating composition. Exemplary catalysts include tetrabutylammonium chloride, tetrabutylammonium bromide, tetrabutylammonium iodide, ethyltriphenyl phosphonium acetate, ethyltriphenyl phosphonium iodide, triphenyl phosphite, 2-methyl imidazole and dibutyltin dilaurate.

In addition, the powder coating composition may include fumed silica or the like as a powder flow additive to reduce caking of the powder during storage. An example of fumed silica is sold by Cabot Corporation under the trademark CAB-O-SIL®. The powder flow additive, when used, is generally present in amounts from ranging from about 0.1 to about 0.5 percent by weight based on the total weight of the powder coating composition. The powder flow additive is generally added to the particulate powder coating composition after preparation of the particulate mixture.

The thermosetting powder coating compositions are prepared by melt blending the ingredients of the coating composition. This can be accomplished by first blending in a high shear or high-intensity dry mixer, e.g., a Wellex mixer, and then melt blending the mixture in an extruder at a temperature from about 80° C. to about 130° C. The extrudate is then cooled and pulverized into a powder. The powder coating composition can be applied directly to metal such as steel or aluminum, glass, plastic, or fiber-reinforced plastic substrates.

Application of the powder can be by electrostatic spraying or by the use of a fluidized bed. Electrostatic spraying is preferred. The powder coating composition can be applied in one pass or in several passes to provide a film thickness after cure of about 0.5 to about 5 mils. Preferably, to provide a high-quality finish at reasonable cost, the thickness of the powder coating is from about 1.2 to about 4 mils, preferably from about 1.4 to about 3 mils.

The substrate to be coated can optionally be preheated prior to application of the powder to promote more uniform powder deposition. Upon application of the powder, the powder-coated substrate is baked typically at from about 300° F. to about 400° F. (149° C. to 204° C.) for from about 5 to about 60 minutes, preferably about 20 to about 40 minutes.

The present invention will be more fully understood from the following illustrative examples wherein all quantities, percentages and ratios are on a weight basis unless otherwise indicated.

EXAMPLE A

A carboxylic acid group-containing acrylic polymer was prepared from the following ingredients:

| Ingredients | Parts by Weight (grams) |
| --- | --- |
| Kettle Charge | |
| Xylene | 1060.5 |
| Initiator Charge | |
| Ditertiarybutyl peroxide | 37.1 |
| Xylene | 41.3 |
| Monomer Charge I | |
| Styrene | 219.9 |
| Butyl acrylate | 50.3 |
| Acrylic acid | 16.8 |
| Mercaptopropionic acid | 0.83 |
| Monomer Charge II | |
| Styrene | 573.6 |
| Butyl acrylate | 125.8 |
| Acrylic acid | 87.8 |
| Mercaptopropionic acid | 11.5 |
| Monomer Charge III | |
| Styrene | 593.9 |
| Butyl acrylate | 85.8 |
| Acrylic acid | 97.6 |
| Mercaptopropionic acid | 11.5 |
| Monomer Charge IV | |
| Xylene | 71.0 |
| Acrylic acid | 30.0 |
| Post Addition | |
| Sebacic acid | 82.2 |
| MODAFLOW[1] | 18.8 |

[1] Polyethyl-2-ethylhexyl acrylate available from Monsanto Company.

The Kettle Charge was heated to reflux under a nitrogen atmosphere in a glass flask equipped with a mechanical stirrer, condenser and additional funnels. Monomer Charge I and the Initiator Charge were added to the reaction vessel simultaneously. Monomer Charge I was complete in about 30 minutes followed by the start of Monomer Charge II which was completed in about one hour. Monomer Charge III was then started and was completed in about 30 minutes at which time the addition of the Initiator Charge was also completed. Monomer Charge IV was then started and completed in about one hour. Throughout these additions, the reaction temperature was kept at about 134° C. to 136° C. The addition funnels were rinsed with 12.5 grams each of xylene and the rinse added to the reaction mixture. At the completion of the additions, the reaction mixture was held at about 134° C. to 135° C. for about two hours and cooled to 100° C. This was followed by addition of the sebacic acid and MODAFLOW. The reaction mixture was then heated under vacuum to devolatilize the solvent. The resultant solid reaction product had a solids content of 99.6 percent, a number average molecular weight of 4,858 and a Tg of 65.

EXAMPLE B

Bis[N,N-di(beta-hydroxyethyl)] adipamide-glutaramide was prepared from the following mixture of ingredients:

| Ingredients | Parts by Weight (grams) |
|---|---|
| 90/10 weight ratio of dimethyl adipate/dimethyl glutarate | 2491.4 |
| Diethanolamine | 3635.6 |
| Potassium hydroxide | 12.0 |

The ingredients were charged to a reaction vessel and heated to about 100° C. at which point the distillation of methanol began. Reaction was continued while distilling methanol (a total of 590 g) until a temperature of 111° C. was reached. A partial vacuum (150 millimeters (mm) of mercury) was applied to the reaction vessel and an additional 275 g of methanol was removed. About 865 g of fresh methanol was then added to the reaction vessel, followed by addition of 4,800 milliliters (ml) of acetone. As the reaction mixture cooled, the hydroxyalkylamide precipitated. The precipitate was filtered, washed with acetone and air dried to yield a reaction product melting at about 114° C. to about 118° C.

The following examples are of thermosetting pigmented powder coating compositions.

EXAMPLE 1

A pigmented powder coating composition was prepared from the following mix of ingredients:

| Ingredients | Parts by Weight (grams) |
|---|---|
| Carboxylic acid group-containing acrylic polymer of Example A | 489.36 |
| ARALDITE GT 7071[1] | 142.60 |
| ARALDITE GT 7013[2] | 125.83 |
| Beta-hydroxyalkylamide of Example B | 52.34 |
| Catalyst blend[3] | 20.60 |
| Titanium dioxide | 496.35 |
| Carbon black | 0.1 |
| Benzoin | 1.99 |
| Ultramarine blue | 6.23 |
| MODAFLOW III[4] | 9.97 |

[1] Polyglycidyl ether of bisphenol A having an epoxy equivalent weight of about 480, available from Ciba-Geigy Corporation.
[2] Polyglycidyl ether of bisphenol A having an epoxy equivalent weight of about 640 to 735, available from Ciba-Geigy Corporation.
[3] A blend of 15 percent by weight of an ethyl triphenyl phosphonium acetate (ETPPA) solution available from Morton Thiokol, Inc. as a 70 percent by weight solution of ETPPA in an alcohol and 85 percent by weight of the acrylic polymer of Example A.
[4] MODAFLOW III is a poly(ethylacrylate-2-ethylhexylacrylate) on a silica carrier available from Monsanto Company.

The ingredients of the formulation were blended in a high-intensity mixer and then melt blended in a Baker Perkins twin screw extruder at 110° C. The extrudate was chilled and flaked on a chill roller, ground in a micromill and sieved through a 140-mesh screen. The resultant powder was then electrostatically sprayed onto grounded steel panels using an electrostatic spray gun. Each coated panel was then baked at 400° F. (203° C.) for about 20 minutes to form a glossy coating. The properties of the resultant coating are reported in Table 1 below.

EXAMPLE 2

A pigmented powder coating composition was prepared from the following mix of ingredients:

| Ingredients | Parts by Weight (grams) |
|---|---|
| Carboxylic acid group-containing acrylic polymer of Example A | 366.74 |
| ARALDITE GT 7071 | 172.29 |
| ARALDITE GT 7013 | 152.02 |
| Beta-hydroxyalkylamide of Example B | 63.24 |
| Dodecanedioic acid | 51.65 |
| Catalyst blend[1] | 20.50 |
| Titanium dioxide | 496.35 |
| Black iron oxide | 0.1 |
| Ultramarine blue | 1.91 |
| Benzoin | 6.23 |
| MODAFLOW III | 9.97 |

[1] As in Example 1.

The ingredients of the formulation were blended in a high-intensity mixer, followed by melt blending in a Baker Perkins twin screw extruder at 110° C. The extrudate was chilled and flaked on a chill roller, ground in a micromill and sieved through a 140-mesh screen. The resultant powder was then electrostatically sprayed onto grounded steel panels using an electrostatic spray gun. Each coated panel was then baked at 400° F. (203° C.) for about 20 minutes to form a glossy coating. The properties of the resultant coating are given in Table 1 below.

TABLE 1

| Example No. | Direct Impact Resistance[1] in Inch-Pounds (coating thickness in mils) | Mandrel Bend[2] | Pencil[3] Hardness | Detergent[4] Resistance | Salt Spray[5] |
|---|---|---|---|---|---|
| 1 | 80 (2.8) | ⅛"/0" | 3H | good | no creepage |

TABLE 1-continued

| Example No. | Direct Impact Resistance[1] in Inch-Pounds (coating thickness in mils) | Mandrel Bend[2] | Pencil[3] Hardness | Detergent[4] Resistance | Salt Spray[5] |
|---|---|---|---|---|---|
| 2 | 90 (2.7) | 7/16"/⅛" | 3H | poor | no creepage |

Test Procedures

[1] The impact resistance was measured with a Gardner Impact Tester. The coated panels were subjected to increasing amounts of impact until the coating cracked. The panel was impacted on the coating side, i.e., direct impact. The results are reported in inch-pounds and the thickness of the coating in mils is shown in the parenthesis.

[2] The mandrel bend test involved bending coated panels (4" × 12") around a ⅛-inch mandrel and measuring cracking/delamination in inches along the bend line.

[3] Pencil hardness was determined by taking pencils of increasing hardness (from F to 4H) and attempting to etch a scribe mark in the coating. The hardness of the first pencil that would etch the coating is reported as the pencil hardness of the coating.

[4] Detergent resistance was determined by soaking a coated substrate having a scribed cross-hatching pattern, for 250 hours in a detergent bath containing 20 gallons of water, 404 grams (g) of sodium pyrophosphate, 88.7 g of sodium alkylarylsulfonate available as Fisher S-198 from Fisher Scientific Company, 31.8 g of sodium metasiliate, 86 g of anhydrous sodium sulfate and 4.6 g of anhydrous sodium carbonate. The detergent bath was held at 170° F.

[5] The salt spray corrosion resistance was measured by scribing the cured coated panels with an "X" and exposing the scribed panels to a salt spray fog at 100° F. (38° C.) as generally described in ASTM B-117-73 "Standard Method of Salt Spray (Fog) Testing". The panels were removed from the salt spray fog after about 1,100 hours and dried. The scribe mark was then taped with masking tape, the tape pulled off at a 45° angle to the panel surface and any creepage from the scribe mark measured. Creepage is any rusted, darkened area of the panel where the coating has been lifted from the panel surface.

Although the present invention has been described with reference to specific details, it is not intended that such details should be regarded as limitations upon the scope of the invention except as and to the extent that they are included in the accompanying claims.

What is claimed is:

1. A thermosetting powder coating composition comprising:
   (1) a co-reactable particulate mixture of:
   (a) from about 35 to about 85 percent by weight based on weight of resin solids of a carboxylic acid group-containing polymer having a Tg in the range of about 35° C. to 100° C.;
   (b) from about 2 to about 45 percent by weight based on weight of resin solids of a polyepoxide having a 1,2- epoxy equivalency of greater than 1.0; and
   (c) a beta-hydroxyalkylamide of the structure:

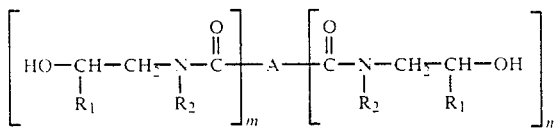

where $R_1$ is H or $C_1$–$C_5$ alkyl; $R_2$ is H, $C_1$–$C_5$ alkyl or

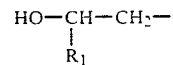

where $R_1$ is as described above and A is a chemical bond or monovalent or polyvalent organic radical derived from saturated, unsaturated or aromatic hydrocarbon radicals including substituted hydrocarbon radicals containing from 2 to 20 carbon atoms, m equals 1 to 2, n equals 0 to 2 and m+n is at least 2, and the equivalent ratio of beta-hydroxyalkylamide equivalents plus epoxy equivalents to carboxylic acid equivalents being within the range of 0.6 to 1.6:1; and
   (2) a crystalline carboxylic acid group-containing material selected from the group consisting of an aliphatic polycarboxylic acid containing from 4 to 20 carbon atoms, a polymeric polyanhydride other than carboxylic acid group-containing polymer (a), a polyester other than carboxylic acid group-containing polymer (a), having a number average molecular weight from about 300 to about 1,500 and an acid equivalent weight of from about 150 to about 750, and mixtures thereof 2. The composition of claim 1 wherein the carboxylic acid group-containing polymer is an acrylic polymer having a number average molecular weight from about 1,500 to about 15,000.

* * * * *